United States Patent
Kelly et al.

(10) Patent No.: US 12,400,658 B2
(45) Date of Patent: Aug. 26, 2025

(54) SYSTEM AND METHOD FOR AUTOMATED OBSERVATION AND ANALYSIS OF INSTRUCTIONAL DISCOURSE

(71) Applicants: UNIVERSITY OF PITTSBURGH-OF THE COMMONWEALTH SYSTEM OF HIGHER EDUCATION, Pittsburgh, PA (US); THE REGENTS OF THE UNIVERSITY OF COLORADO, Denver, CO (US)

(72) Inventors: Sean P. Kelly, Pittsburgh, PA (US); Sidney D'Mello, Boulder, CO (US)

(73) Assignees: University of Pittsburgh—Of the Commonwealth System of Higher Education, Pittsburgh, PA (US); The Regents of the University of Colorado, Denver, CO (US)

( * ) Notice: Subject to any disclaimer, the term of this patent is extended or adjusted under 35 U.S.C. 154(b) by 268 days.

(21) Appl. No.: 17/917,429

(22) PCT Filed: Apr. 14, 2021

(86) PCT No.: PCT/US2021/027297
§ 371 (c)(1),
(2) Date: Oct. 6, 2022

(87) PCT Pub. No.: WO2021/211716
PCT Pub. Date: Oct. 21, 2021

(65) Prior Publication Data
US 2023/0154465 A1    May 18, 2023

Related U.S. Application Data

(60) Provisional application No. 63/010,328, filed on Apr. 15, 2020.

(51) Int. Cl.
*G10L 15/26* (2006.01)
*G10L 15/01* (2013.01)
(Continued)

(52) U.S. Cl.
CPC .............. *G10L 15/26* (2013.01); *G10L 15/01* (2013.01); *G10L 15/04* (2013.01); *G10L 15/22* (2013.01);
(Continued)

(58) Field of Classification Search
CPC . G10L 21/0208; G10L 21/0272; G10L 15/22; G10L 15/26; G10L 15/04
See application file for complete search history.

(56) References Cited

U.S. PATENT DOCUMENTS 6,453,284 B1 * 9/2002 Paschall ................ G10L 21/028
704/E21.013
8,868,409 B1 * 10/2014 Mengibar ............... G06F 40/30
704/250
(Continued)

FOREIGN PATENT DOCUMENTS

WO    2020068132 A1    4/2020

OTHER PUBLICATIONS

Donnelly et al., "Words matter: automatic detection of teacher questions in live classroom discourse using linguistics, acoustics, and context." Proceedings of the Seventh International Learning Analytics & Knowledge Conference. (Year: 2017).*
(Continued)

*Primary Examiner* — Samuel G Neway
(74) *Attorney, Agent, or Firm* — Philip E. Levy; Eckert Seamans Cherin & Mellott, LLC

(57) ABSTRACT

A method of analyzing instructor discourse includes recording an audio signal representing speech of the instructor during a class session, converting the audio signal to a
(Continued)

session transcript comprising speech data for the session using an automatic speech recognition tool and segmenting the transcript into utterances, extracting a set of features from the session transcript, filtering student talk out from the utterances, analyzing a first subset of the features to produce a number of local context predictions for each utterance of the session transcript, analyzing a second subset of the features to produce a number of global context predictions for the session transcript, and combining a subset of the number of local context predictions and the number of global context predictions into a classification that attends to differential reliability.

26 Claims, 4 Drawing Sheets

(51) Int. Cl.
    *G10L 15/04*       (2013.01)
    *G10L 15/22*       (2006.01)
    *G10L 21/0208*     (2013.01)
    *G10L 21/0272*     (2013.01)

(52) U.S. Cl.
    CPC ...... *G10L 21/0208* (2013.01); *G10L 21/0272* (2013.01)

(56) References Cited

U.S. PATENT DOCUMENTS

| | | |
|---|---|---|
| 10,388,178 B2 | 8/2019 | Graesser et al. |
| 10,522,169 B2 | 12/2019 | Tanner et al. |
| 10,769,962 B1 * | 9/2020 | Beigman Klebanov ..................... G09B 7/02 |
| 2015/0154956 A1 * | 6/2015 | Brown ................... G06F 16/353 704/235 |
| 2018/0130496 A1 | 5/2018 | Mahapatra et al. |
| 2018/0218382 A1 * | 8/2018 | Ye ........................... G06N 20/20 |
| 2019/0035390 A1 * | 1/2019 | Howard .................. G06F 3/167 |
| 2019/0121532 A1 | 4/2019 | Strader et al. |
| 2019/0228261 A1 * | 7/2019 | Chan ..................... G06F 16/221 |
| 2019/0385711 A1 | 12/2019 | Shriberg et al. |
| 2021/0272467 A1 * | 9/2021 | Yang ..................... G06Q 50/20 |
| 2022/0172725 A1 * | 6/2022 | Khan Khattak .... G10L 15/1822 |
| 2023/0154465 A1 * | 5/2023 | Kelly ..................... G10L 15/04 704/200 |

OTHER PUBLICATIONS

Suresh et al., "Automating analysis and feedback to improve mathematics teachers' classroom discourse." Proceedings of the AAAI conference on artificial intelligence. vol. 33. No. 01. (Year: 2019).*

Blanchard et al., "Identifying teacher questions using automatic speech recognition in classrooms." Proceedings of the 17th annual meeting of the special interest group on discourse and dialogue. (Year: 2016).*

Emily Jensen et al., Toward Automated Feedback on Teacher Discourse to Enhance Teacher Learning, CHI '20, Apr. 25-30, 2020, Honolulu, HI, USA, © 2020 Association for Computing Machinery. ACM ISBN 978-1-4503-6708-0/20/04.

Sean Kelly et al., Automatically Measuring Question Authenticity in Real-World Classrooms, Educational Researcher, vol. 47 No. 7, pp. 451-464 2018.

Cathlyn Stone et al., "Utterance-level Modeling of Indicators of Engaging Classroom Discourse" In: Proceedings of the 12th International Conference on Educational Data Mining (EDM 2019), Collin F. Lynch, Agathe Merceron, Michel Desmarais, & Roger Nkambou (eds.) 2019, pp. 420-425.

* cited by examiner

SYSTEM AND METHOD FOR AUTOMATED OBSERVATION AND ANALYSIS OF INSTRUCTIONAL DISCOURSE

CROSS-REFERENCE TO RELATED APPLICATIONS

This patent application is a U.S. National Application Filed Under 35 U.S.C. 371 of PCT International Application No. PCT/US2021/027297, filed on Apr. 14, 2021, entitled "System and Method for Automated Observation and Analysis of Instructional Discourse", which claims the priority benefit under 35 U.S.C. § 119(e) of U.S. Provisional Application No. 63/010,328, filed on Apr. 15, 2020, entitled "System and Method for Automated Observation and Analysis of Instructional Discourse", the contents of which are incorporated herein by reference.

CROSS-REFERENCE TO RELATED APPLICATION

This patent application claims the priority benefit under 35 U.S.C. § 119(e) of U.S. Provisional Application No. 63/010,328, titled "System and Method for Automated Observation and Analysis of Instructional Discourse" and filed on Apr. 15, 2020, the contents of which are incorporated herein by reference.

GOVERNMENT CONTRACT

This invention was made with government support under grant #s 1735785 and 1735740 awarded by the National Science Foundation (NSF). The government has certain rights in the invention.

BACKGROUND

The quality of classroom talk is an important determinant of student engagement and learning. From modeling skills and strategies, to setting high expectations, to connecting material to the "real world," classroom instructor discourse affects equity and excellence in the classroom. However, existing systems and methods of evaluating the quality of instructor discourse have several limitations.

With respect to human-based methods for observing and rating instructor discourse (a principal observing a teacher, for example), halo effects are typically present, meaning that a rater's summary impression of the teacher causes the rater to classify every domain of instruction similarly in spite of real differences. In addition, the reliability of human observations is highly sensitive to rater training, and human rating systems only report to users the aggregate reliability of the system from special reliability studies of repeated measures by different raters. Thus, the actual reliability of a human observation when used in schools by a specific rater is unknown. Furthermore, human raters are inherently limited in supply.

With respect to automated systems for observing and rating instructor discourse, wearable recording systems generally tend to enable coarse-grained analysis of instructor discourse, but such recording systems are not conducive to fine-grained analysis that would provide meaningful feedback to teachers regarding the nature and quality of interaction with their classes. While producing video recordings of class sessions could better enable automated fine-grained analysis of instructor discourse, the use of video data raises serious privacy concerns and so does not provide a practical means for automating the evaluation of instructor discourse.

There is therefore room for improvement in systems and methods for observing and analyzing classroom instructor discourse.

SUMMARY OF THE INVENTION

Accordingly, it is an object of the present invention to provide, in one embodiment, a method of analyzing instructor discourse by receiving an audio signal representing speech of the instructor during a session; converting the audio signal to a session transcript comprising speech data for the session using an automatic speech recognition tool, wherein the session transcript includes a plurality of instructor utterances; extracting a set of features from the session transcript; filtering student talk out from the plurality of instructor utterances; analyzing a first number of the features to produce a number of local context predictions for each utterance of the session transcript; analyzing a second number of the features to produce a number of global context predictions for the session transcript; and combining a subset of the number of local context predictions and the number of global context predictions into a classification.

In another embodiment, a system for analyzing instructor discourse includes: an automatic speech recognition component structured and configured for receiving an audio signal representing speech of the instructor during a session and converting the audio signal to a session transcript comprising speech data for the session, wherein the session transcript includes a plurality of instructor utterances; and an analysis component structured and configured for (i) extracting a set of features from the session transcript, (ii) filtering student talk out from the plurality of instructor utterances. (iii) analyzing a first number of the features to produce a number of local context predictions for each utterance of the session transcript, (iv) analyzing a second number of the features to produce a number of global context predictions for the session transcript, and (v) combining a subset of the number of local context predictions and the number of global context predictions into a classification.

DETAILED DESCRIPTION OF EXEMPLARY EMBODIMENTS

Figure 1:
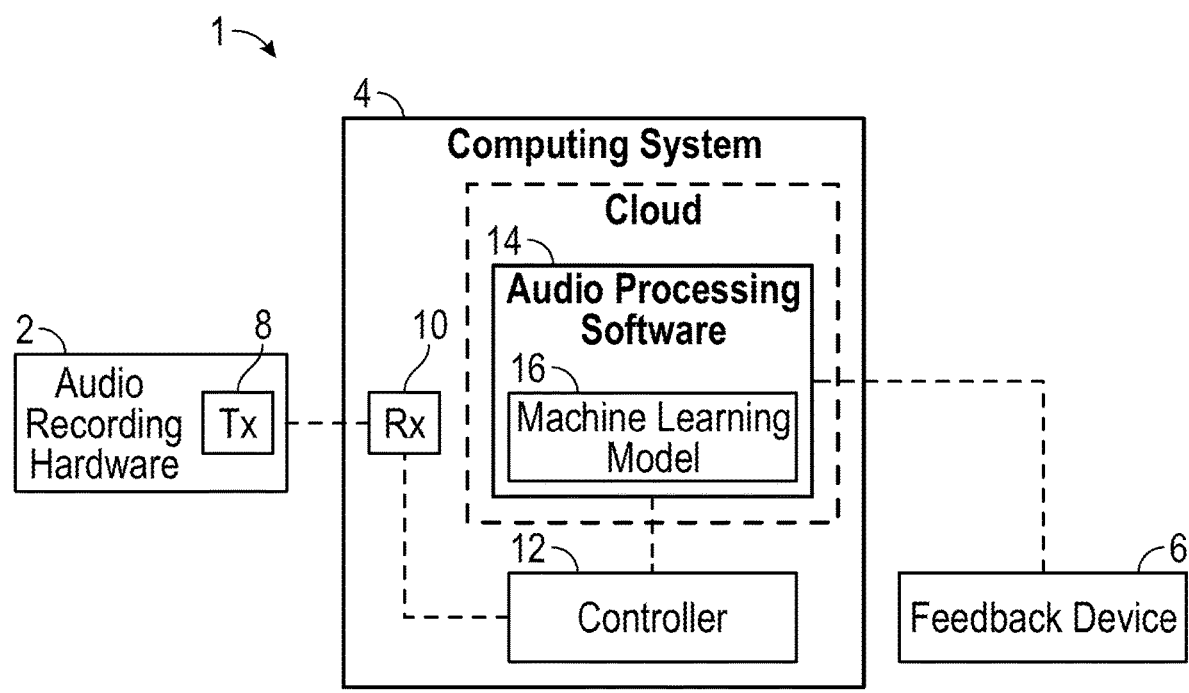
FIG. 1 is a schematic depiction of an instructor discourse analysis system, in accordance with an exemplary embodiment of the disclosed concept.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs.

As used herein, "directly coupled" means that two elements are directly in contact with each other.

As used herein, the term "number" shall mean one or an integer greater than one (i.e., a plurality).

As used herein, the terms "component" and "system" are intended to refer to a computer related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term "controller" shall mean a number of programmable analog and/or digital devices (including an associated memory part or portion) that can store, retrieve, execute and process data (e.g., software routines and/or information used by such routines), including, without limitation, a field programmable gate array (FPGA), a complex programmable logic device (CPLD), a programmable system on a chip (PSOC), an application specific integrated circuit (ASIC), a microprocessor, a microcontroller, a programmable logic controller, or any other suitable processing device or apparatus. The memory portion can be any one or more of a variety of types of internal and/or external storage media such as, without limitation, RAM, ROM, EPROM(s), EEPROM(s), FLASH, and the like that provide a storage register, i.e., a non-transitory machine readable medium, for data and program code storage such as in the fashion of an internal storage area of a computer, and can be volatile memory or nonvolatile memory.

As used herein, the term "machine learning model" shall mean a software system that develops and builds a computational model based on sample data, known as "training data", in order to make predictions or decisions without being explicitly programmed to do so, including, without limitation, a computer software system that has been trained to recognize patterns from a set of training data, and subsequently develops algorithms to classify patterns from the training data set in other data sets. The term "machine learning model" shall include, without limitation, machine learning classifier techniques like random forest classifiers, and machine learning regression techniques like random forest regressions.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

The disclosed concept will now be described, for purposes of explanation, in connection with numerous specific details in order to provide a thorough understanding of the subject invention. It will be evident, however, that the disclosed concept can be practiced without these specific details without departing from the spirit and scope of this innovation.

The disclosed concept, as described in detail herein, provides a system and method that are tailored to maximize classification of teacher speech, i.e. discourse, with non-obtrusive audio collection during real-world instruction. The system classifies multiple features of teacher discourse that affect student engagement and learning through audio capture, speech transcription, natural language understanding, and computational modeling, providing the user with fine-grained estimates of the prevalence of discourse practices. For example, the system can tell the user the prevalence of teacher discourse that contained open-ended questions or goal-specific language in the classroom, and scale that feedback to match feedback of pedagogical experts. By combining multiple important features/domains of teacher talk, and providing lesson-specific classifications, the system of the present disclosure allows the user to track how the quality of instruction changes from day-to-day, to compare the quality of instruction across curricular designs, and to apply other school improvement uses. Hereinafter, the methods and systems of the disclosed concept may be referred to as the Teacher Talk Tool (3T).

FIG. 1 is a schematic depiction of a 3T discourse analysis system 1, in accordance with an exemplary embodiment of the disclosed concept. FIG. 1 shows how the 3T discourse analysis system 1 integrates audio recording hardware, speech and language processing, and Artificial Intelligence (AI) to accurately classify instructional discourse from authentic classrooms. The discourse analysis system 1 comprises audio recording hardware 2, a computing system 4, and a feedback device 6. Audio recording hardware 2 is ideally unobtrusive and, in the exemplary embodiment, has both audio recording capability and wireless signal transmission capability, and accordingly comprises a wireless signal transmitter 8. In an exemplary embodiment of the disclosed concept, audio recording hardware 2 comprises a wireless microphone headset. A wireless microphone headset is a desirable choice for hardware 2 because it is a low-profile piece of equipment that proves fairly unobtrusive to a classroom instructor while the instructor is leading a class session and is able to record high-quality audio of the instructor's discourse. It will be appreciated that other types of hardware embody both audio recording capability and wireless signal transmission capability (for example and without limitation, a lavalier microphone), and it will be appreciated that audio recording hardware other than wireless microphone headsets can be used without departing from the scope of the disclosed concept. However, obtaining a high-fidelity audio signal is a priority of the 3T system, and wireless microphone headsets produce high quality signals compatible with 3T signal processing techniques programmed into the software 14 of discourse analysis system 1, whereas other types of audio recording hardware generally produce a lesser quality audio signal when processed with the techniques used in accordance with the disclosed concept.

Computing system 4 is a system with both electrical communication and software execution capability. In an exemplary embodiment of the disclosed concept, computing system 4 comprises a wireless signal receiver 10, a controller 12, and audio processing software 14 that includes a trained machine learning model 16. Receiver 10 is configured to receive audio signals transmitted by transmitter 8 for subsequent processing by processing software 14, such processing being described in more detail herein with respect to a process 100 depicted by the flow chart in FIG. 2. In an exemplary embodiment of the disclosed concept, controller 12 forms part of a personal computer such as a laptop or desktop computer. Receiver 10 can comprise either a standalone component in electrical communication with controller 12 or an integrated component of controller 12 without departing from the scope of the disclosed concept. In addition, it will be appreciated that software can be either locally installed on a controller or cloud-based, and in the non-limiting exemplary embodiment of the disclosed concept shown in FIG. 1, processing software 14 is cloud-based. However, processing software 14 can alternatively be locally installed on controller 12 without departing from the scope of the disclosed concept. Machine learning model 16 enables processing software 14 to perform process 100 at levels comparable to human performance, and a process 200 used to train machine learning model 16 is depicted by the flow chart shown in FIG. 3.

Feedback device 6 comprises a controller in electrical communication with the audio processing software 14 of computing system 4, and enables a user to receive and view (e.g., on a display of feedback device 6) the results of the analysis performed by the audio processing software 14. Accordingly, once the processing software 14 completes its analysis of a recorded audio signal from a class session in accordance with process 100 (FIG. 2), the computing system 4 transmits the results to the feedback device 6. In an exemplary embodiment of the disclosed concept, feedback device 6 is a smartphone (for example and without limitation, the personal smartphone of the classroom instructor), however, any type of device having a controller capable of receiving and outputting information from processing software 14 can be used without departing from the scope of the disclosed concept.

Figure 2:
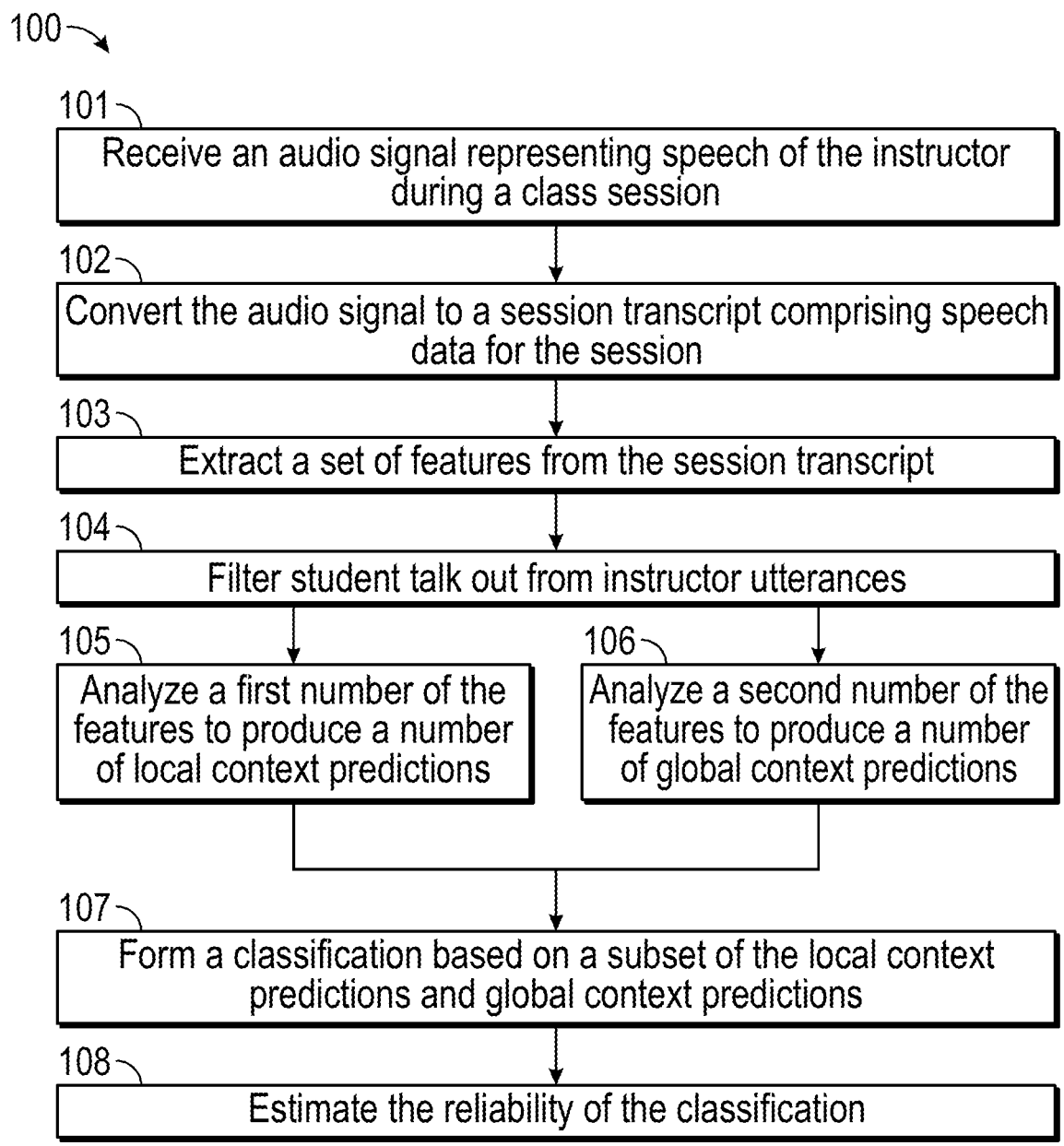
FIG. 2 is a flow chart of a method of analyzing instructor discourse executed by the processing software of the discourse analysis system shown in FIG. 1, in accordance with an exemplary embodiment of the disclosed concept.

Referring now to FIG. 2 in addition to FIG. 1, FIG. 2 shows a flow chart of a process 100 used by the processing software 14 of discourse analysis system 1 to process audio signals recorded by audio recording hardware 2. At step 101 of process 100, after instructor discourse is recorded during a class session by the audio recording hardware 2 and transmitted to receiver 10 by transmitter 8, the audio processing software 14 receives the recorded audio signal received by receiver 10. Processing software 14 is programmed to execute automatic speech recognition instructions in order to obtain text transcriptions from spoken audio signals, and at step 102, processing software 14 converts the recorded audio signal from the class session to a session transcript comprising speech data for the session using an automatic speech recognition tool.

Still referring to step 102, in conjunction with executing the automatic speech recognition instructions, processing software 14 executes natural language processing instructions in order to segment the transcribed text of the audio signal into units referred to as utterances. A single utterance is simply a coherent unit of speech, delineated from a previous or subsequent utterance by a pause of length p, with the length of pause p being a design choice. Accordingly, if an instructor stops speaking for p or more seconds and subsequently resumes speaking, processing software 14 identifies the stop as a pause, identifies the stream of speech occurring immediately before the pause as a first utterance, and identifies the stream of speech occurring immediately after the pause as a second utterance.

One non-limiting example of an utterance is a statement, and another non-limiting example of an utterance is a question. When an instructor makes a statement, pauses, and then asks a question based on the statement, processing software 14 recognizes the statement as one utterance and recognizes the question as another utterance distinct from the statement based at least on the pause. Given how people naturally tend to speak in general, it will be appreciated that if an instructor were to make two statements successively (or to ask two questions successively), the instructor would likely similarly pause at least briefly between the first statement and the second, and processing software 14 would recognize the first statement as being a first utterance and would recognize the second statement as being a second utterance. As previously stated, the length of a pause p used by processing software 14 to delineate one utterance from the next is a design choice, and it is suggested that pauses on the scale of slightly under 1 second to slightly over 1 second are most effective for automatic recognition of natural speech patterns. For example and without limitation, pauses of approximately 1.0 seconds have been found to be ideal, but pauses of 0.6 seconds have been used as well. It will be appreciated that setting p to too low a value increases the likelihood of over-counting utterances, while setting p to too high a value increases the likelihood of under-counting utterances.

At step 103 of process 100, processing software 14 identifies and extracts a set of talk features from the session transcript. In exemplary embodiments of the disclosed concept, such talk features include acoustic-prosodic features, linguistic, context features, n-grams, and contextual semantics (also referred to as contextual embeddings). Acoustic-prosodic features are properties of speech related to acoustics (i.e. the volume) or prosody (i.e. pitch, tone). Context features are measurements related to a current utterance with respect to surrounding utterances, e.g. the length of a pause between two utterances. Linguistic features embody analysis of the linguistic properties of speech, e.g. the number of personal pronouns or the number of words present in a unit of speech. N-grams are counts of words and phrases including unigrams (i.e. a single word like "new"), bigrams (i.e. a two word phrase like "New York", trigrams (i.e. a three word phrase like "New York City"), and so on. Contextual embeddings refer to high-dimensional vectors that enable discernment of the meaning of a word, phrase, or utterance that resembles other similar words, phrases, or utterances. For example and without limitation, if processing software 14 identifies a homonym such as the word "bank" in the session transcript, extracted contextual embeddings enable processing software 14 to determine which meaning of "bank" is intended as informed by the context of the utterance, i.e. either "bank" as a financial institution or "bank" as the land at the edge of a river. The aforementioned high-dimensional vectors can be obtained from a wide variety of sources, for example and without limitation, from training data used to train machine learning model 16 as detailed later herein with respect to process 200 depicted in FIG. 3, from internet-based encyclopedias, or from known pre-trained word embedding models such as Globe, word2vec. Bidirectional Encoder Representations from Transforms (BERT), etc.

As described in more detail herein with respect to steps 105 and 106 of process 100, the feature extraction performed at step 103 enables identification of several discourse variables in the session transcript. Discourse variables describe the nature of an utterance, and non-limiting examples of discourse variables include instructional talk, questions, authentic questions, elaborated evaluation, high cognitive level, uptake, goal specificity, and ELA terms. Instructional talk focuses on the lesson and learning goals, as opposed to other topics such as classroom management or procedural talk. Questions are simple requests for information. Authentic questions are open-ended questions for which the teacher does not have a pre-scripted answer. Elaborated evaluations are expressions of judgment or correctness of a student's utterance with explicit guidance for student learning and thinking. High cognitive level questions or statements emphasize analysis, rather than reports or recitation of facts.

Uptake questions or statements incorporate ideas from a student utterance into a subsequent statement or question. Goal specificity statements encompass the extent to which the instructor explains the process and end goals of a particular activity. ELA terms refer to an utterance incorporating disciplinary terms.

It will be appreciated that student talk (student talk comprising any combination of one or more student utterances or fractions of a student utterance) can incidentally be captured by a microphone of audio recording hardware 2, causing the student talk to bleed into the instructor utterances in the transcript, and at step 104 of process 100, processing software 14 filters out the student talk. Filtering of student talk can be achieved, for example and without limitation, by distinguishing between strong noise and weak noise first, applying distance filtering next, and then either removing or reclassifying noisy instances.

Prior to describing the remaining steps of process 100, it should be noted that processing software 14 is designed based on data obtained from human observations of instructor discourse during class sessions and human evaluations of recorded audio signals and transcripts of those class sessions. As such, processing software 14 is designed to perform the functions that a human observer would otherwise perform in evaluating instructor discourse during a class session and is programmed with several data sets of humans observations and evaluations against which software 14 can compare newly observed data sets. Accordingly, hereinafter, the terms "human labelling" and "human range", as well as references to actions performed by a "human", are used when describing the results of instructor discourse analysis performed by humans, as processing software 14 is programmed to contain a database of the results of discourse analysis performed by humans (as described in more detail herein with respect to process 200 used to train machine learning model 16, depicted in FIG. 3).

Continuing to refer to process 100, at step 105, processing software 14 analyzes each utterance for the presence or absence of each discourse variable using a number of the talk features identified at step 103, and this utterance-level evaluation is used to produce local context predictions. Local context predictions predict local classifications of single utterances, such local classifications including, for example and without limitation: probabilistic, binary, and ordinal. A probabilistic classification signifies a probability that a given utterance is a specific type of discourse variable, for example, a determination that there is a 0.7 probability that a given utterance is a question. A binary classification signifies whether or not a given utterance is a specified discourse variable, for example, a determination that a given utterance either is a question or is not a question. An ordinal classification signifies, on an ordinal scale, the extent to which an utterance contains or indicates a talk feature (e.g., 0=no disciplinary terms; 1=some terms; 2=substantial terms).

Still referring to step 105, in an exemplary embodiment of the disclosed concept, a Random Forest classifier is used to predict the presence of a discourse variable within each utterance using the acoustic-prosodic, linguistic, context, n-gram, and context embedding talk features. However, other suitable techniques can be used without departing from the scope of the disclosed concept. In the same exemplary embodiment, after predicting the presence or absence of the discourse variable for each utterance, the local utterance predictions are averaged at the class session level to obtain a proportional occurrence of utterances containing that discourse variable per class session. Finally, processing software 14 normalizes the predictions to match the range of values generated by human labelling.

At step 106, processing software 14 merges all of the utterances in the session transcript and makes global context predictions about the proportional occurrence of each discourse variable over the course of the entire class session using a number of the talk features identified at step 103. Global context predictions predict measures of central tendency and variability at the lesson/session observation level. Global context predictions include, for example and without limitation, predictions of: proportions, means, counts, and variances of each of the discourse variables within a lesson or instructional session. In an exemplary embodiment of the disclosed concept, processing software 14 uses a Random Forest regressor to directly predict the proportion of the entire class session in which each discourse variable is present. In the same exemplary embodiment, only the n-gram talk features are used since the predictions are not being made based on individual utterances. However, suitable techniques other than a Random Forest regressor that include relevant information inherent to the entire class session in the analysis can be used without departing from the scope of the disclosed concept. Processing software 14 then normalizes the predictions to match the range of values generated by human labelling. Although step 105 and step 106 are numbered sequentially, these steps are performed in parallel, as depicted in the flow chart of FIG. 2. In one non-limiting illustrative example of the execution of steps 105 and 106, if processing software 14 identifies 500 utterances in a class, processing software 14 will identify at step 105 which of the 500 utterances contain open-ended questions and then aggregate the local utterance level predictions to a session level estimate. In the same example, processing software 14 will directly estimate at step 106 the proportion of the 500 utterances that are open-ended at the global session level.

At step 107, the utterance level local context predictions found at step 105 and the session level global context predictions found at step 106 can be combined to produce an overall discourse classification. Non-limiting examples of classifications that can be produced at step 107 include quantifying, for a particular class session, the prevalence of instructor discourse that contained open-ended questions or goal-specific language. By providing the classification(s) produced at step 107 to the instructor via feedback device 6, the discourse analysis system 1 enables the instructor to track how the quality of instruction changes from day to day, to compare the quality of instruction across curricular designs, and to apply the classification(s) to other school improvement applications.

Still referring to step 107, in an exemplary embodiment of the disclosed concept, combining the local context predictions and global context predictions comprises averaging the normalized predictions determined at step 105 and the normalized predictions determined at step 106, and then re-normalizing the averages to match the range of values generated by human labelling. This approach simultaneously minimizes multiple error criteria and maximizes distributional overlap with human classifications. The integration of modeling from the local level of individual utterances with the global session-level modeling renders the discourse analysis system 1 particularly robust in handling errors in automatic speech transcription and well-equipped to handle the problem of extreme class imbalance posed by rare events. As the term suggests, "rare events" are those classroom events that occur relatively infrequently. In one non-limiting example, sanctioning would generally be considered a rare event in elementary school classrooms, as it is expected that instances of praise would be high frequency events in elementary class sessions while instances of sanctioning would occur fairly rarely. The ability of the 3T system to handle errors in automatic speech transcription and the problem of extreme class imbalance posed by rare events represents an improvement to existing systems and methods for classifying instructor discourse.

Continuing to refer to step 107, there may be situations where it is preferable for the computational model of processing software 14 to rely on only local predictions or only global predictions, but not both, in producing the classification. Accordingly, in additional exemplary embodiments of the disclosed concept, the selected combination of the local predictions and global predictions used to produce the classification includes either only local predictions or only global predictions, but not both. Stated alternatively, the classification produced at step 107 can be said to be based upon a subset of the local predictions and global predictions, wherein the subset includes either both the local predictions and global predictions, only the local predictions (or a subset thereof), or only the global predictions (or a subset thereof).

Furthermore, at step 108, processing software 14 can estimate the reliability of the classification found at step 107 by using input features of the class session being analyzed to produce an utterance- and session-specific estimate of the system's own reliability. Non-limiting examples of the input features that can be used to produce this reliability estimate include summary statistics for the automatic speech recognition engine's estimated transcription confidence, direct measures of several specific acoustic-prosodic features of the observation, utterance-level word features (e.g. number of words per utterance), n-grams used in an utterance, utterance- and session-level contextual embeddings, and session level word/text features, as well as estimates of the talk features themselves. Two attributes of reliability estimates should be noted. First, reliability estimates can be estimated at both the individual utterance level and the session level. Second, utterance-level reliability estimates can be aggregated to the session-level, and weighting or filtering of the utterance-level predictions can be used to improve overall performance of discourse analysis system 1.

Continuing to refer to the reliability estimation performed at step 108, the utterance- and session-specific reliability estimate capability enables processing software 14 to assess and flag potentially unreliable observations in order to prevent delivery of an unreliable assessment to the discourse analysis system 1 user. In addition, in research settings when group comparisons are being made, the utterance- and session-specific reliability estimate capability enables a user to explicitly incorporate differences in measurement quality across groups into statistical modeling. The ability of instructor discourse system 1 to generate this internal reliability estimate and apply the reliability estimates to adjust the measures of the primary discourse models represents another improvement to existing systems and methods for classifying instructor discourse.

Figure 3:
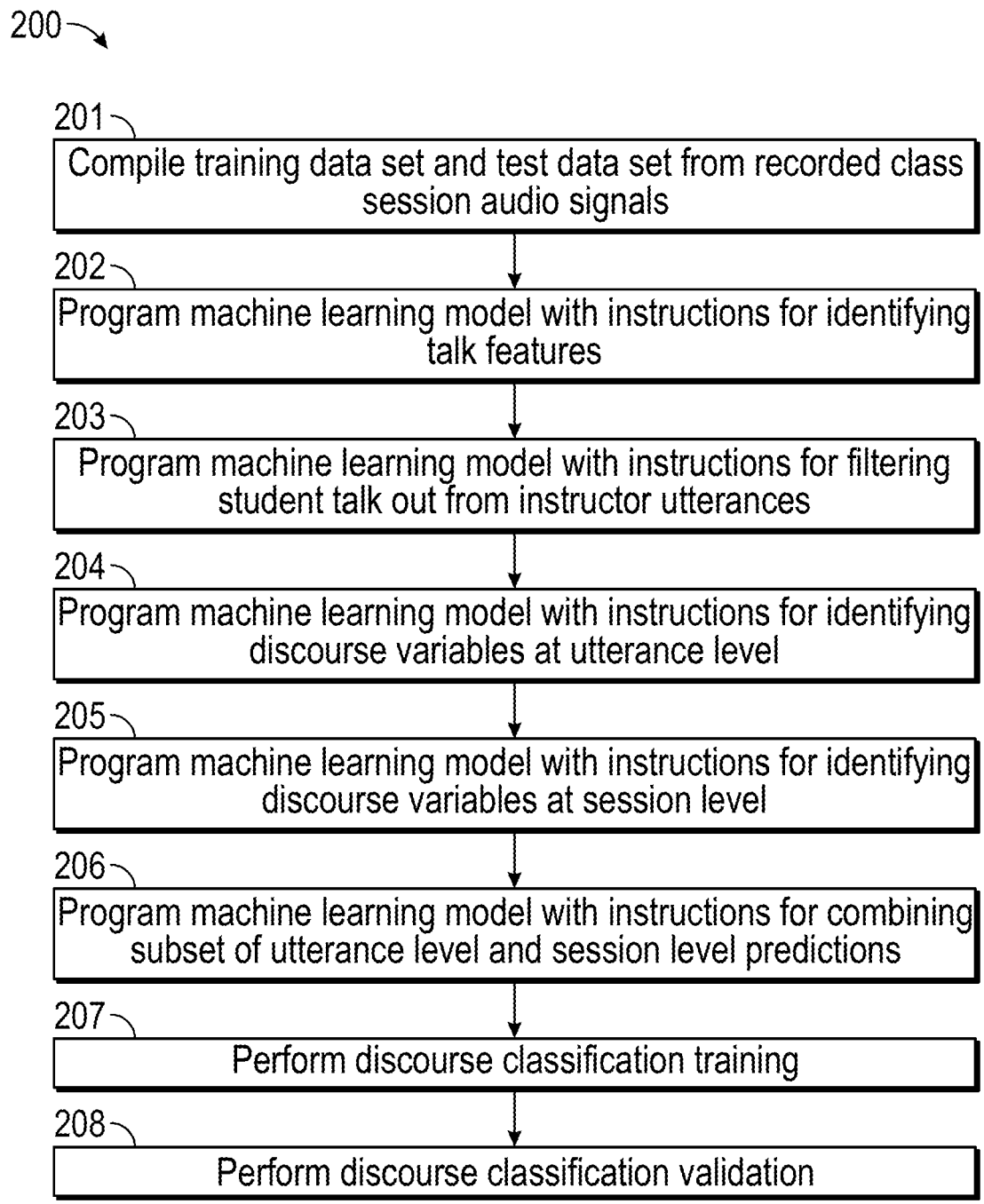
FIG. 3 is a flow chart of a method for training the machine learning model included in the processing software of the discourse analysis system shown in FIG. 1, in accordance with an exemplary embodiment of the disclosed concept.

It will be appreciated that several aspects of the analysis performed by processing software 14 during process 100 require the use of human-like decision making, for example and without limitation, the prediction of the presence or absence of discourse variables at steps 105 and 106. Accordingly, the flow chart in FIG. 3 depicts a process 200 used to train the machine learning model 16 of processing software 14 to analyze instructor discourse data in a manner that closely replicates the analysis a human would perform. It should be noted that machine learning model 16 can comprise a number of machine learning models, i.e. either a single machine learning model or multiple machine learning models each trained to perform different steps of process 200 that work in conjunction with one another, without departing from the scope of the disclosed concept.

At step 201 of process 200, a training dataset and a test dataset are compiled. For example and without limitation, compiling the training and test datasets comprises: recording audio signals of instructor discourse for several instructors and several class sessions, transcribing the recorded audio signals using speech recognition and natural language processing software, having people analyze the session transcripts according to process 100, and then designating a portion of the recorded class sessions as training sessions such that their data is included in the training dataset while designating the remainder of the sessions as test sessions such that their data is included in the test dataset. It will be appreciated that the greater the number of class sessions used to train the machine learning model 16 is, the more accurate and generalizable the machine learning model 16 is likely to be.

At step 202, machine learning model 16 is programmed with instructions for identifying talk features from the recorded audio signal and resulting session transcript, as programming software 14 does at step 103 of process 100. In exemplary embodiments of the disclosed concept, such talk features include acoustic-prosodic, linguistic, context, n-gram features, and contextual embeddings. At step 203, machine learning model 16 is programed with instructions for filtering student talk from instructor utterances from the recorded audio signal and resulting session transcript, as programming software 14 does at step 104 of process 100. In an exemplary embodiment of the disclosed concept, machine learning model 16 is programmed to distinguish between strong noise and weak noise first, apply distance filtering next, and then either remove or reclassify noisy instances.

At step 204, machine learning model 16 is programmed with instructions for identifying discourse variables for each utterance, which enables programming software 14 to make local context predictions at step 105 of process 100. Accordingly, in an exemplary embodiment, the machine learning model 16 is programmed to identify discourse variables at the utterance level using a Random Forest classifier to analyze acoustic-prosodic, linguistic, context, n-gram talk features, and contextual embeddings and subsequently normalize the predictions to match the range of values generated by human labelling. However, machine learning model 16 can be trained to use other suitable techniques to identify discourse variables at the utterance level without departing from the scope of the disclosed concept.

At step 205, machine learning model 16 is programmed with instructions for predicting the proportional occurrence of each discourse variable for the entire session transcript, which enables programming software 14 to make global context predictions at step 106 of process 100. Accordingly, in an exemplary embodiment, the machine learning model 16 is programmed to directly predict the proportion of a discourse variable for the entire class session transcript using a Random Forest regressor to analyze only n-gram talk features and subsequently normalize the predictions to match the range of values generated by human labelling. However, machine learning model 16 can be trained to use other suitable techniques to identify discourse variables at the session level without departing from the scope of the disclosed concept. At step 206, machine learning model 16 is programmed with instructions for combining a subset of the utterance level local context predictions and session level global context predictions, which enables programming software 14 to produce an overall discourse classification at step 107 of process 100. Accordingly, in an exemplary embodiment, the machine learning model 16 is programmed to average normalized local context predictions and normalized global context predictions, and then re-normalize the averages to match the range of values generated by human labelling.

At step 207, discourse classification training is performed, wherein machine learning model 16 is provided with the training dataset and the results of the human analysis of the training dataset performed at step 201. During discourse classification training, machine learning model 16 analyzes the session transcripts in the training data set as well as the results of the human analysis performed on the training data set at step 201, using the instructions programmed into the machine learning model 16 at steps 202-206. As part of discourse classification training, machine learning model 16 is trained to perform the reliability estimation performed at step 108 of process 100. In an exemplary embodiment of the disclosed concept, machine learning model 16 is trained to focus on identifying and reducing misclassifications or erroneous predictions.

Figure 4:
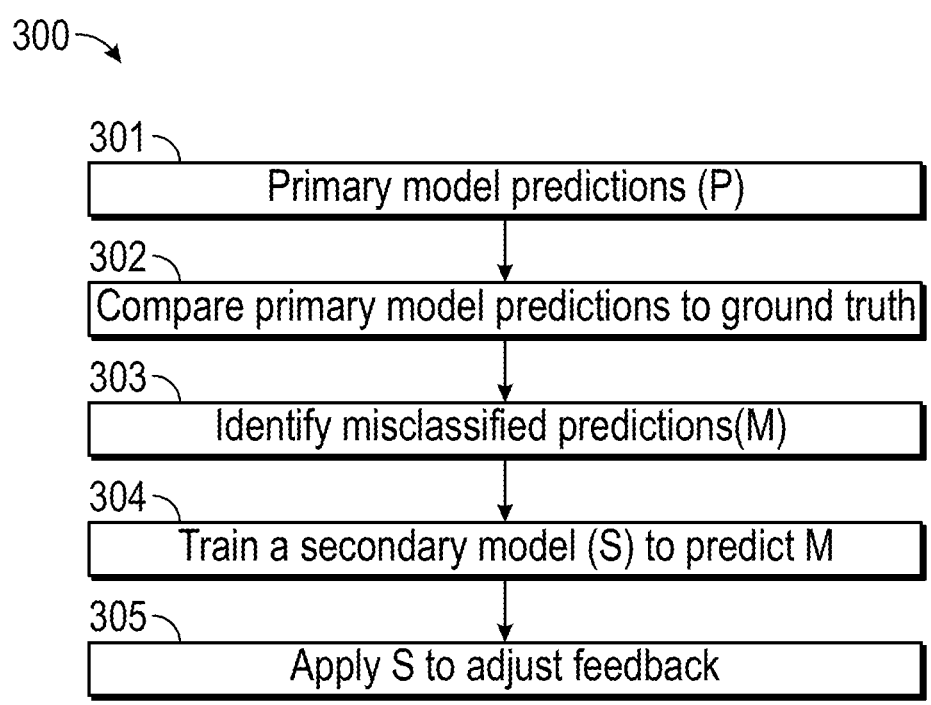
FIG. 4 is a flow chart of a method for training the machine learning model shown in FIG. 1 to produce reliability estimates during execution of the method depicted in FIG. 3, in accordance with an exemplary embodiment of the disclosed concept.

Continuing to refer to training machine learning model 16 at step 207 to perform the reliability estimation, the approach used in accordance with an exemplary embodiment of the disclosed concept is constructing algorithms that directly model misclassifications in a trained machine learning model 16. In the same exemplary embodiment, primary model predictions are performed, wherein a primary classification model, a secondary noise model distinct from the primary classification model, and a number of additional distinct classification models and secondary noise models are produced, and ensembles of the classification and noise models use voting (or some aggregation method) to detect, i.e. predict, noisy instances of training data. Referring briefly to FIG. 4, the reliability estimate training process 300 of machine learning model 16 is depicted in the flow chart shown in the figure, and the predictions for detecting noise made by the primary classification and noise models as described above constitute step 301 of process 300. The remainder of the reliability estimation training of machine learning model 16, i.e. steps 302-305 shown in FIG. 4, is completed as part of discourse classification validation performed at step 208 of process 200, as described herein below.

At step 208 of process 200, discourse classification validation is performed, wherein the session transcripts from the test dataset are provided to machine learning model 16 so that machine learning model 16 can analyze each session transcript by again using the instructions programmed into the machine learning model 16 at steps 202-206. In contrast to the training step 207, the manual analysis of the test data set transcripts performed at step 201 is not provided to machine learning model 16 step 208, and the performance of machine learning model 16 is evaluated manually at step 208 by comparing the results of the automated analysis performed at step 207 to the results of the human analysis performed for the test data set at step 201.

Still referring to step 208 of process 200 and referring again to process 300 depicted in FIG. 4, the remainder of the reliability estimation training commenced at step 207 continues. First, the primary model predictions (made at step 301) are manually compared to ground truth at step 302. At step 303, primary model predictions that were misclassified at step 207 are manually identified. At step 304, a secondary classification model is trained to predict misclassifications based on the findings at step 303. Lastly, at step 305, the secondary classification model is applied to adjust the initial results of the automated analysis performed at step 207. It should be noted that the automated analysis performed at step 207 is also referred to as "feedback", as the object of machine learning model 16 is to provide feedback about instructor discourse. Process 200 is repeated and the instructions provided to machine learning model 16 at steps 202-206 are adjusted as necessary until the performance of the machine learning model 16 is deemed satisfactory.

Process 300 improves the efficacy of discourse analysis system 1 by making it robust to circumstances for which machine learning model 16 may not have been explicitly trained. In one non-limiting example, if the primary discourse classification model of machine learning model 16 was trained before the COVID-19 pandemic, it may misclassify an utterance that contains the word "covid". Such a misclassification would be due to the content of the utterance not being part of the vocabulary of machine learning model 16. In another non-limiting example, a teacher hurrying to finish a lesson within a short amount of time toward the end of a class session may start speaking at an unusually high rate of speech and/or in short, choppy sentences, leading to misclassification of her utterances during that period of time due to her rushed conversational style. Accordingly, in exemplary embodiments of the disclosed concept, two types of secondary classification models are trained at step 304 of process 300: a first type trained on the content of utterances, and a second type trained on conversational features.

After detailing the processes 100 and 200 used to record and analyze instructor discourse and train the machine learning model 16 of processing software 14, it will be appreciated that discourse analysis system 1 can be thought of as having an automatic speech recognition component and an analysis component. The automatic speech recognition component is an aggregate component comprising the individual components of analysis discourse system 1 that receive an audio signal and convert the signal to a session transcript, such as the audio recording hardware 2, the controller 4, and the automatic speech recognition and natural language processing components of audio processing software 14. The analysis component can be thought of as comprising the components of audio processing software 14 that: identify and extract the set of talk features from the session transcript at step 103 of process 100, filter the student talk from the utterances at step 104 of process 100, perform the utterance level analysis of the session transcript to produce local context predictions at step 105 of process 100, perform the session level transcript analysis to produce global context predictions at step 106 of process 100, combine a subset of the local context predictions and global context predictions to produce a classification at step 107 of process 100, and estimate the reliability of the classification at step 108 of process 100.

In sum, the 3T system is tailored to have a low economic cost, high usability with limited practice by classroom instructors, flexibility across educational settings, and non-intrusiveness such that normal educational practice is unhampered. Furthermore, the 3T system incorporates two particular improvements to existing systems and methods that allow for accurate instructional classification even from imperfect audio signals in real-world classrooms. First, the 3T system reduces error and addresses the challenge posed by rare events by seamlessly integrating information from the local context of utterances and the global session.

Second, unlike traditional methods of observation where the reliability of the system is an aggregate feature of the system and not of specific observations, the 3T system assesses the internal reliability of its classifications, enabling it to automatically flag and remove unreliable observations, as well as improve overall system estimates. These two innovations play a central role in making the integrated 3T application a teacher-friendly visualization interface for displaying feedback on a teacher's classroom instruction.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. An automated method of analyzing instructor discourse, comprising:
    recording, with an audio recording device, an audio signal representing speech occurring during a session of discourse between an instructor and students;
    transmitting the audio signal, with a signal transmitter, to a computing system including audio processing software;
    converting the audio signal, with the audio processing software of the computing system, to an electronic session transcript comprising speech data for the session using an automatic speech recognition tool of the audio processing software, wherein the electronic session transcript includes a plurality of utterances and wherein the audio processing software processes the electronic session transcript using natural language processing instructions to identify and segment the plurality of utterances;
    extracting, with the audio processing software of the computing system, a set of talk features from the electronic session transcript;
    filtering, with the audio processing software of the computing system, student talk out from the plurality of utterances to produce a plurality of instructor utterances by analyzing the audio signal;
    concurrently analyzing, with the audio processing software of the computing system, (i) each instructor utterance using a first number of the talk features to produce a number of local context predictions for the instructor utterances and (ii) a merger of all of the instructor utterances using a second number of the talk features to produce a number of global context predictions for the electronic session transcript, each local context prediction pertaining to the presence or absence of a number of discourse variables in each instructor utterance and each global context prediction pertaining to a proportional occurrence of each discourse variable over the entirety of the session; and
    combining, with the audio processing software of the computing system, a subset of the number of local context predictions and the number of global context predictions into a classification,
    wherein, for a given instructor utterance in the plurality of instructor utterances, the classification signifies that a differentiation has been made between the following discourse variable types in classifying the given utterance: instructional talk, questions, authentic questions, elaborated evaluation, high cognitive level, uptake, goal specificity, and ELA terms.

2. The method according to claim 1, further comprising producing an estimate of a reliability of the classification based on a number of input features.

3. The method according to claim 2, wherein the number of input features include one or more of statistics relating to a transcription confidence of the converting by the automatic speech recognition tool, a direct measure of a number of acoustic-prosodic features of audio signal, a number of utterance level word features of the session transcript, a number of session level word/text features of the session transcript, utterance- and session-level contextual embeddings, and estimates of a number of the talk features of the session transcript.

4. The method according to claim 1, wherein the combining comprises scaling the subset of the number of local context predictions and the number of global context predictions to a human range, and combining the scaled subset of the number of local context predictions and number of global context predictions into the classification.

5. The method according to claim 1, wherein the analyzing each instructor utterance using the first number of the talk features to produce the number of local context predictions is performed by a machine learning technique implemented in a trained machine learning model included in the audio processing software.

6. The method according to claim 5, wherein the machine learning technique comprises a machine learning classifier technique.

7. The method according to claim 6, wherein the machine learning classifier technique comprises a random forest classifier.

8. The method according to claim 1, wherein the analyzing the merger of all the instructor utterances using the second number of the talk features to produce the number of global context predictions is performed by a machine learning technique implemented in a trained machine learning model included in the audio processing software.

9. The method according to claim 8, wherein the machine learning technique comprises a machine learning regression technique.

10. The method according to claim 9, wherein the machine learning regression technique comprises a random forest regression.

11. The method according to claim 1, wherein the set of features comprises acoustic-prosodic features, context features, linguistic features, n-grams, and contextual semantics.

12. The method according to claim 11, wherein the first number of the features includes the acoustic-prosodic features, the context features, the linguistic features, the n-grams, and the contextual semantics, and wherein the second number of the features includes only the n-grams.

13. A system for analyzing instructor discourse, comprising:
audio processing software stored in a non-transitory computer readable medium and executable by a computing system, the audio processing software including:
an automatic speech recognition component configured for receiving an audio signal representing speech occurring during a session of discourse between an instructor and students recorded by an audio recording device and transmitted to the computing system, the automatic speech recognition component being configured for converting the audio signal to an electronic session transcript comprising speech data for the session using an automatic speech recognition tool, wherein the electronic session transcript includes a plurality of utterances and wherein the automatic speech recognition component is configured to process the electronic session transcript using natural language processing instructions to identify and segment the plurality of utterances; and
an automated analysis component configured for: (i) extracting a set of talk features from the electronic session transcript, (ii) filtering student talk out from the plurality of utterances to produce a plurality of instructor utterances by analyzing the audio signal, (iii) concurrently analyzing (a) each instructor utterance using a first number of the talk features to produce a number of local context predictions for the instructor utterances and (b) a merger of all of the instructor utterances using a second number of the talk features to produce a number of global context predictions for the electronic session transcript, wherein each local context prediction pertains to the presence or absence of a number of discourse variables in each instructor utterance and each global context prediction pertains to a proportional occurrence of each discourse variable over the entirety of the session, and (iv) combining a subset of the number of local context predictions and the number of global context predictions into a classification,
wherein, for a given utterance in the plurality of utterances, the classification signifies that a differentiation has been made between the following discourse variable types in classifying the given utterance: instructional talk, questions, authentic questions, elaborated evaluation, high cognitive level, uptake, goal specificity, and ELA terms.

14. The system according to claim 13, wherein the analysis component is further configured for producing an estimate of a reliability of the classification based on a number of input features.

15. The system according to claim 14, wherein the number of input features include one or more of statistics relating to a transcription confidence of the converting by the automatic speech recognition tool, a direct measure of a number of acoustic-prosodic features of audio signal, a number of utterance level word features of the session transcript, a number of session level word/text features of the session transcript, utterance- and session-level contextual embeddings, and estimates of a number of the talk features of the session transcript.

16. The system according to claim 13, wherein the combining comprises scaling the subset of the number of local context predictions and the number of global context predictions to a human range, and combining the scaled subset of the number of local context predictions and number of global context predictions into the classification.

17. The system according to claim 13, wherein the analyzing each instructor utterance using the first number of the talk features to produce the number of local context predictions is performed by a machine learning technique implemented in a trained machine learning model included in the audio processing software.

18. The system according to claim 17, wherein the machine learning technique comprises a machine learning classifier technique.

19. The system according to claim 18, wherein the machine learning classifier technique comprises a random forest classifier.

20. The system according to claim 13, wherein the analyzing the merger of all of the instructor utterances using the second number of the talk features to produce the number of global context predictions is performed by a machine learning technique implemented in a trained machine learning model included in the audio processing software.

21. The system according to claim 20, wherein the machine learning technique comprises a machine learning regression technique.

22. The system according to claim 21, wherein the machine learning regression technique comprises a random forest regression.

23. The system according to claim 13, wherein the set of features comprises acoustic-prosodic features, context features, linguistic features, n-grams, and contextual semantics.

24. The system according to claim 23, wherein the first number of the talk features includes the acoustic-prosodic features, the context features, the linguistic features, the n-grams, and the contextual semantics, and wherein the second number of the talk features includes only the n-grams.

25. The method according to claim 1, wherein the extracting, filtering and analyzing are performed a trained machine learning model included in the audio processing software.

26. The system according to claim 13, wherein the extracting, filtering and analyzing are performed a trained machine learning model included in the audio processing software.

* * * * *